US012679116B2

(12) United States Patent
Urrutia Nebreda et al.

(10) Patent No.: US 12,679,116 B2
(45) Date of Patent: Jul. 14, 2026

(54) PRINTERS AND ENCODERS

(71) Applicant: Hewlett-Packard Development Company, L.P., Spring, TX (US)

(72) Inventors: Martin Urrutia Nebreda, Sant Cugat del Valles (ES); Joan Marti Velasco Figueras, Sant Cugat del Valles (ES); Jose Antonio Lopez Gonzalez, Leon (ES); Jorge Porras Martinez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 181 days.

(21) Appl. No.: 18/690,635

(22) PCT Filed: Sep. 10, 2021

(86) PCT No.: PCT/US2021/071413
§ 371 (c)(1),
(2) Date: Mar. 8, 2024

(87) PCT Pub. No.: WO2023/038658
PCT Pub. Date: Mar. 16, 2023

(65) Prior Publication Data

US 2024/0375414 A1 Nov. 14, 2024

(51) Int. Cl.

*B41J 11/00* (2006.01)
*B65H 23/185* (2006.01)
*B41J 15/04* (2006.01)
*B65H 23/00* (2006.01)

(Continued)

(52) U.S. Cl.

CPC ............ *B41J 11/007* (2013.01); *B41J 11/006* (2013.01); *B41J 11/0075* (2013.01); *B41J 11/0095* (2013.01); *B65H 23/185* (2013.01); *B41J 15/04* (2013.01); *B65H 23/005* (2013.01); *B65H 23/182* (2013.01); *B65H 23/195* (2013.01); *B65H 2403/942* (2013.01); *B65H 2513/11* (2013.01); *B65H 2553/51* (2013.01); *B65H 2801/03* (2013.01)

(58) Field of Classification Search

CPC ..... B41J 11/007; B41J 11/006; B41J 11/0075; B41J 11/0095; B41J 15/04; B65H 23/185; B65H 23/005; B65H 23/182; B65H 23/195; B65H 2403/942; B65H 2513/11; B65H 2553/51; B65H 2801/03

See application file for complete search history.

(56) References Cited

U.S. PATENT DOCUMENTS 7,911,625 B2 3/2011 Martin et al.
2005/0263958 A1 12/2005 Knierim et al.

(Continued)

FOREIGN PATENT DOCUMENTS

JP 2017-074975 A 4/2017

*Primary Examiner* — Henok D Legesse
(74) *Attorney, Agent, or Firm* — Jordan IP Law, LLC

(57) ABSTRACT

Examples relate to machine readable storage storing machine readable instructions, arranged when implemented, to process a roller encoder signal, associated with rotation of a substrate engaging roller, and a drive encoder signal, associated with a drive for rotating a carrier bearing the substrate, to determine a characteristic associated with the substrate.

10 Claims, 8 Drawing Sheets

(51) Int. Cl.
*B65H 23/182* (2006.01)
*B65H 23/195* (2006.01)

(56) References Cited

U.S. PATENT DOCUMENTS

| | | | | |
|---|---|---|---|---|
| 2009/0283565 | A1* | 11/2009 | Ibanez .................. | G01B 21/12<br>702/158 |
| 2010/0283584 | A1 | 11/2010 | McAllister Clarke | |
| 2014/0151288 | A1 | 6/2014 | Miller et al. | |
| 2015/0175374 | A1 | 6/2015 | Horaguchi | |
| 2020/0215831 | A1 | 7/2020 | Fort Filgueira et al. | |
| 2020/0369048 | A1 | 11/2020 | Gracia Verdugo et al. | |
| 2021/0178786 | A1 | 6/2021 | Izoe et al. | |

* cited by examiner

200

300A

300B

400A

400B

500

600

PRINTERS AND ENCODERS

BACKGROUND

Large format printers can print onto expensive media or substrates that can be damaged if the substrate is incorrectly threaded or fed into a media path.

BRIEF INTRODUCTION OF THE DRAWINGS

Examples will be described with reference to the accompanying drawings in which

DETAILED DESCRIPTION

Figure 1:
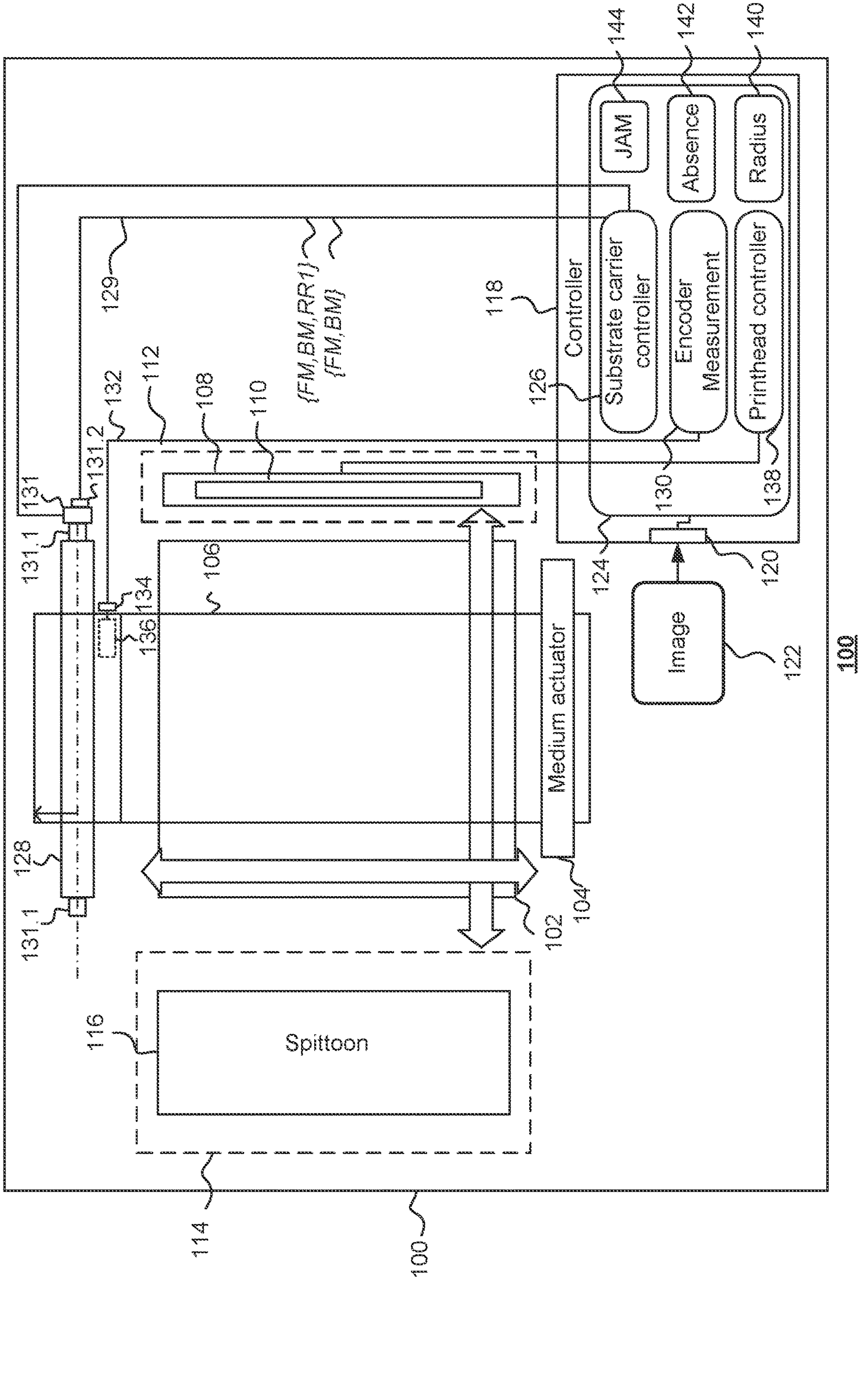
FIG. 1 shows a printer.

FIG. 1 illustrates a schematic plan view of a printer 100. The printer 100 comprises: a working area 102 in which a printed substrate can be produced. The substrate can comprise any sheet or roll form of medium. The working area is an example of a printing region. The printer 100 further comprises a substrate actuator 104. The substrate actuator 104 moves a substrate 106 on which printing liquid is to be deposited in between print traversals of a printhead carriage 108. A print traversal is a movement of the printhead carriage 108 from one side of the working area 102 to the other side of the working area.

The printhead carriage 108 comprises a set of printheads 110 for printing one or more than one printing liquid. The set of printheads 110 can comprise an array of nozzles (not shown) to deposit any such printing liquids. Examples can be realised in which the set of printheads 110 comprises a number of such printheads. The set of printheads 110 is arranged to deposit respective printing liquids onto the substrate 106. The one or more than one printing liquids can comprise one or more printing liquids associated with a respective colour process. Such a colour process can comprise a single tone or multiple tones. For example, a six-colour process, involving magenta, yellow, cyan, red and two blacks, can be used. Similarly, a nine-colour process can be accommodated via 5 printheads.

The printhead carriage 108, in this example, is arranged to traverse the working area 102 in a reciprocating manner. While traversing the working area 102, the printheads 110 can print the printing liquids onto the substrate 106. The printheads can deposit printing liquid onto the substrate 106 in either one direction, or both directions, of traversal. Depositing the printing liquids can use a thermal technique in which a heating element is arranged to heat the printing liquid rapidly so that printing liquid is ejected from a nozzle orifice associated with the heating element.

A stowage area 112 can be provided to one side of the working area 102. The printhead carriage 108 can be stowed in the stowage area 112 between printing traversals.

A maintenance area 114 can be provided to another side of the working area 102. The maintenance area 114 is an example of a maintenance region. The maintenance area 114 can comprise a spittoon 116 for receiving one or more than one printing liquid during a maintenance operation. Examples can be provided in which a maintenance operation can comprise ejecting or expelling printing liquid from one or more than one of printhead of the set of printheads 110. Maintenance operations such as, for example, spitting a printing liquid, purging a printing liquid, printing a printing liquid, flushing a printing liquid, wiping a printing liquid, taken jointly and severally in any and all permutations, are examples of such ejecting or expelling printing liquids.

Although the examples have been, or are, described with reference to separate stowage 112 and maintenance 114 areas, examples can alternatively be realised in which the stowage 112 and maintenance 114 areas are the same, which means a single such area can be provided as opposed to two such areas.

A controller 118 is provided for controlling one or more aspects of the printer and/or printer operations. The controller 118 comprises an input interface 120 for receiving an image 122 to be printed. The controller 118 can control the printing operations used to print the image 122 onto the substrate 106 via printing control logic 124. Printing control logic 124 can comprise software, hardware, or a combination of hardware and software arranged to implement the operations and control described herein. Therefore, the examples described herein provide methods, machines, software, hardware, firmware, combinations of hardware and software, systems, and devices for authentication using an authenticator or a number of authenticators or of authenticating using an authenticator or a number of authenticators. Any and all methods described can support or provide authentication of a user or of multiple users. Any and all methods described can support or provide authentication of a device or machine or of devices or machines. Any and all methods can provide or support authentication of a combination of a user and a device or a machine or of a combination of users and devices or machines. The items circuitry, hardware, software, firmware, machine instructions, taken jointly and severally in any and all permutations constitute logic to perform a respective function or operation.

Figure 2:
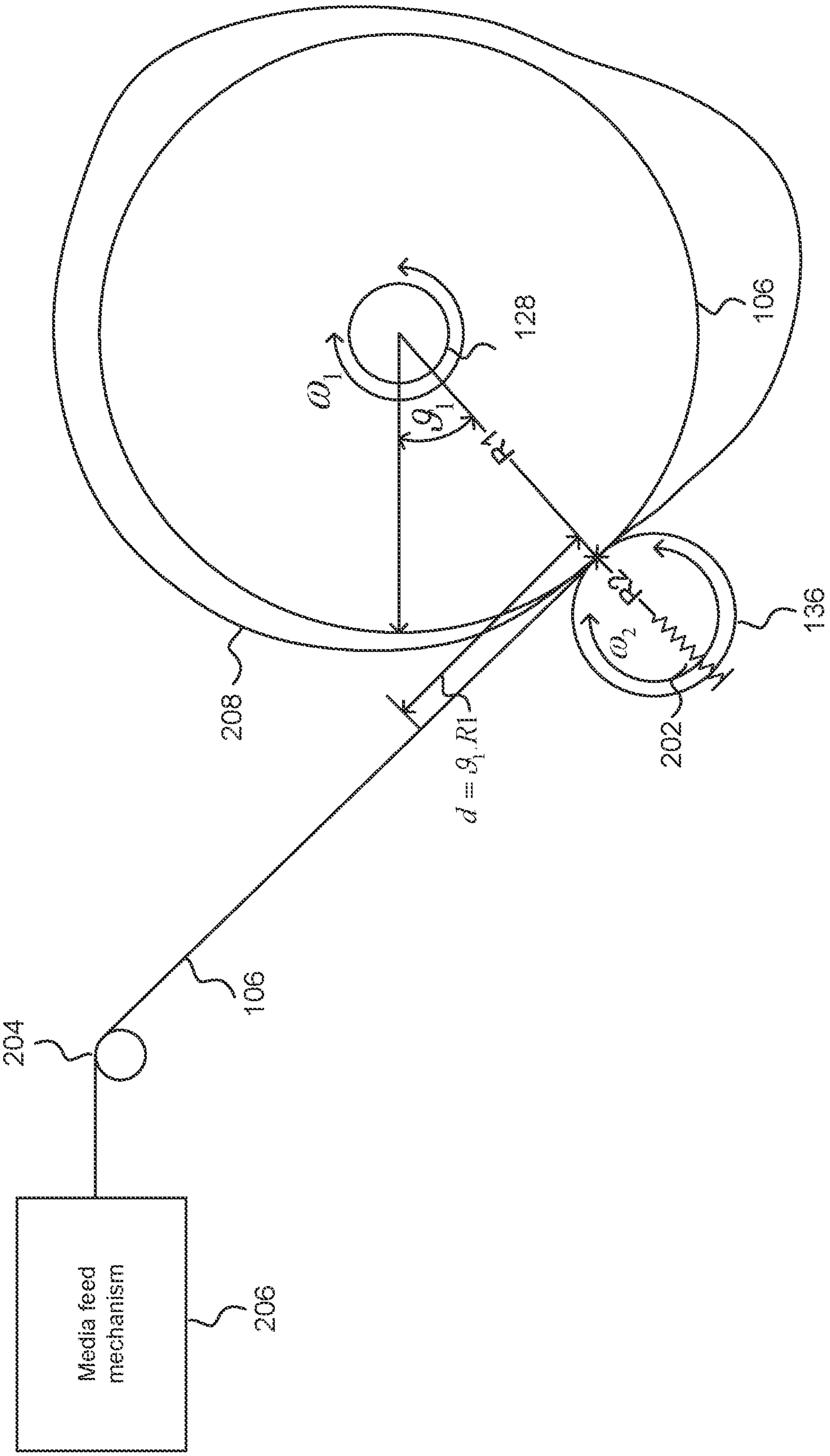
FIG. 2 illustrates a substrate and substrate path.

The printing control logic 124 comprises a substrate carrier controller 126 for controlling actuation of a substrate carrier 128. Actuation of the substrate carrier 128 is responsive to a drive motor 131. The drive motor 131 is a bi-directional motor for rotating the mount 131.1 bearing the substrate carrier 128 in a clockwise or anticlockwise direction. The mount 131.1 is an example of a mount to receive a carrier bearing the substrate. In the example depicted, the substrate carrier 128 is a roller bearing the substrate 106. The substrate carrier controller 126 is arranged to unspool or spool the substrate 106 from or onto the substrate carrier 128. Unspooling the substrate 106 from the substrate carrier 126 comprises rotating the substrate carrier 126 in a forward or unwind direction, which is illustrated in FIG. 2 as a clockwise direction by controlling the drive motor 131. Spooling the substrate 106 onto the substrate carrier 126 comprises rotating the substrate carrier 126 in a backwards or rewind direction, which is shown in FIG. 2 as an anti-clockwise direction.

The printing control logic 124 comprises encoder measurement logic 130 for monitoring an output signal 132 of encoder 134 that is actuated by a roller 136. The roller 136 is an example of a substrate engaging roller. The encoder is an example of a roller encoder. The output signal 132 is an example of a roller encoder signal. The roller 136 is actuated, via a substrate engagement surface, by the substrate 106 on the substrate carrier 128. A frictional coupling between the substrate 106 on the substrate carrier 128 and the roller 136 causes the roller 136 to rotate in the opposite direction to the substrate carrier 128. Rotation of the roller 136 rotates the encoder 134 to produce the output signal 132.

The printing control logic 124 comprises a printhead controller 138 for controlling the operation of the printhead carriage 108 and the set of printheads 110, including carriage movement, printhead actuations or operation and maintenance operations.

The printing control logic 124 comprises substrate assessment logic 140 for determining a characteristic associated with the substrate 106. The characteristic associated with the substrate 106 can comprise the amount of substrate 106 on the substrate carrier 128, a radial measure associated with the substrate 106 on the carrier 128, the volume of substrate 106 on the carrier, the length of substrate on the carrier 128 or some other measure associated with the substrate. The radial measure associated with the substrate 106 on the carrier 128 can comprise the radius or diameter of the substrate 106 on the carrier 128.

The printing control logic 124 comprises a carrier presence or absence detector 142. The presence or absence detector 142 is arranged to detect the presence or absence of the substrate carrier 128 in the printer 100.

The printing control logic 124 comprises a substrate anomaly detector 144. The substrate anomaly detector 144 is arranged to detect a substrate anomaly such as, for example, a jam. Detecting such a substrate anomaly is an example of determining a state or movement status associated with the substrate 106.

Referring to FIG. 2, there is shown a side view 200 of a portion of the substrate path from the substrate carrier 128 through the printer 100. The view 200 depicts the substrate carrier 128 bearing the substrate 106 and the roller 136 frictionally engaged with the unspooled portion of the substrate 106 on the substrate carrier 128. The roller 136 is arranged to be urged against the unspooled substrate 106 on the substrate carrier 128 to influence or otherwise increase the frictional engagement between the unspooled substrate 106 and the roller 138. Therefore, examples can be realised in which a bias mechanism or arrangement 202 is provided to urge the roller 136 against the unspooled substrate 106.

The substrate 106 is coupled, via a further roller 204, into the substrate feed mechanism 206 that feeds the substrate 106 through the printer 100, that is, across the work area 102. The substrate feed mechanism 206 is an example of the above described medium actuator 104.

The substrate 106 has been illustrated as exhibiting an unspooling anomaly 208. In the example shown, the unspooling anomaly 208 is a media or substrate bag. Such an anomaly arises due to a mismatch in unspooling the substrate 106 from the substrate carrier 128 and take-up or consumption of the substrate 106 by the substrate feed mechanism 206, in particular, when the rate of unspooling of the substrate 106 from the substrate carrier 128 exceeds the rate of substrate take-up or consumption by the substrate feed mechanism 206. Forming such an anomaly is exacerbated in the case of a substrate jam, which causes the roller 136 to stop rolling.

Examples can be realised in which substrate assessment logic 140 is arranged to determine the radius, R1, of the substrate 106 on the substrate carrier 128. The encoder 134 is arranged to generate the encoder output signal 132 in response to the roller 136 rotating. The encoder output signal 132 is used to determine the angular speed, $\omega_2$, of roller 136. The substrate carrier 128 has an associated set of signals 129. Examples can be realised in which the associated set of signals 129 comprises a signal indicative of rotation of the substrate carrier. The associated set of signals 129 can be produced by a respective encoder 131.2 such as, for example, a quadrature encoder or by any other arrangement. The associated set of signals 129 is used by the substrate assessment logic 140 to determine the angular speed, $\omega_1$, of the substrate carrier 128. The radius, R2, of the roller 136 is known. Therefore, the radius, R1, of the substrate 106 on the substrate carrier 128 can be calculated from: $R1=(\omega_2 \cdot R2)/\omega_1$.

Knowing the radius, R1, of the substrate 106 on the substrate carrier 128 allows the controller to perform associated control operations or make determinations relating to the amount of substrate 106 on the substrate carrier 128. For example, examples can be realised in which the controller 118 can vary, via the substrate carrier controller 126, the angular speed, $\omega_1$, of the substrate carrier 128, or determine the amount of substrate 106 remaining on the substrate carrier 128, determine when a presently installed substrate carrier 128 will need to be changed, that is, when the substrate 106 on the presently installed substrate carrier 12 will run out. The substrate carrier controller 126 can vary the angular speed, $\omega_1$, of the substrate carrier 128 in response to the rate of consumption of the unspooled substrate by the printer 100. The examples described herein can be realised such that the substrate carrier controller 126 can vary the angular speed, $\omega_1$, of the substrate carrier 128 so that the rate of unspooling of the substrate 106 from the substrate carrier matches, or matches to within a determined margin or tolerance, the rate of consumption of the unspooled substrate by the printer 100. During a loading phase in which the substrate 106 is being loaded into the printer 100, the radius R1 can be used to calculate the angular speed of the outer perimeter of the roll of substrate to move the substrate at a given linear speed, $v=\omega_1 \cdot R1$, and to calculate the total rotation of the roll of substrate to unspool a length, d, of the substrate given by $\vartheta_1=d/R1$. Once the substrate 106 has been loaded, the radius can also be used to control the tension in the substrate 106.

Examples can additionally, or alternatively, be realised in which the set of signals 129 comprises an indication of the direction of rotation of the substrate carrier 128, or at least a pair of signals having a variable lead-lag relationship according to a direction of rotation from which such an indication of the direction of rotation of the substrate carrier 128 can be derived, an indication of whether or not the substrate carrier 128 is rotating, or an indication of whether or not the roller 136 is rotating taken jointly and severally in any and all permutations.

The presence or absence detector 142 can be arranged to be responsive to the set of signals 129 comprising such an indication of the direction of rotation of the substrate carrier 128, an indication of whether or not the substrate carrier 128 is rotating, and an indication of whether or not the roller is rotating to detect the presence or absence of the substrate carrier 128. The presence or absence detector 142 detects the presence or absence of the substrate carrier 128 from the following combinational logic: Absence=BM AND RR1 AND $\overline{RR2}$=TRUE, where BM is an indication of backwards or anti-clockwise rotation of the motor for rotating the substrate carrier 128, RR1 is an indication of rotation of the motor for rotating the substrate carrier 128 and RR2 is an indication of the rotation of the roller 136. The combinational logic: Absence=BM AND RR1 AND $\overline{RR2}$=TRUE can be simplified to: Absence=BM AND $\overline{RR2}$=TRUE since RR1=TRUE whenever BM=TRUE in which case the set of signals 129 would comprise an indication of the direction of rotation of the substrate carrier, or driving motor 131, and an indication of whether or not the roller 136 is rotating. It will be appreciated that an absence of movement of the roller 136 in the presence of a backward or anti-clockwise signal to the motor 131 driving the substrate carrier 128 implies a lack of coupling between the substrate 106 on the substrate carrier 128 and the roller 136. A lack of coupling between the substrate 106 and the roller 136 implies at least one, or both, of the substrate carrier 128 not being installed or the substrate 106 not being properly installed.

The substrate anomaly detector 144 can be arranged to be responsive to the set of signals 129 comprising such an indication of the direction of rotation of the substrate carrier 128, an indication of whether or not the substrate carrier 128 is rotating, and an indication of whether or not the roller is rotating to detect the presence or absence of the substrate carrier 128. The substrate anomaly detector 144 detects whether or not there is an anomaly, such as a jam error, associated with the substrate 106 from the following combinational logic: Jam=FM AND RR1 AND $\overline{RR2}$=TRUE, where FM is an indication of forward or clockwise rotation of the motor for rotating the substrate carrier 128, RR1 is an indication of rotation of the motor for rotating the substrate carrier 128 and RR2 is an indication of the rotation of the roller 136. The combinational logic: Jam=FM AND RR1 AND $\overline{RR2}$=TRUE can be simplified to combinational logic: Jam=FM AND $\overline{RR2}$=TRUE since RR1=TRUE whenever FM=TRUE in which case the set of signals 129 would comprise an indication of the direction of rotation of the substrate carrier 128, or driving motor 131, and an indication of whether or not the roller 136 is rotating. It will be appreciated that an absence of movement of the roller 136 in the presence of a forward or clockwise signal to the motor driving the substrate carrier 128 implies jam condition or error associated with the unspooled substrate.

Examples can be realised in which the set of signals 129 comprises {FM, BM} and in which {RR2} is inferred from the signal 132 output from the encoder 134.

Figure 3A:
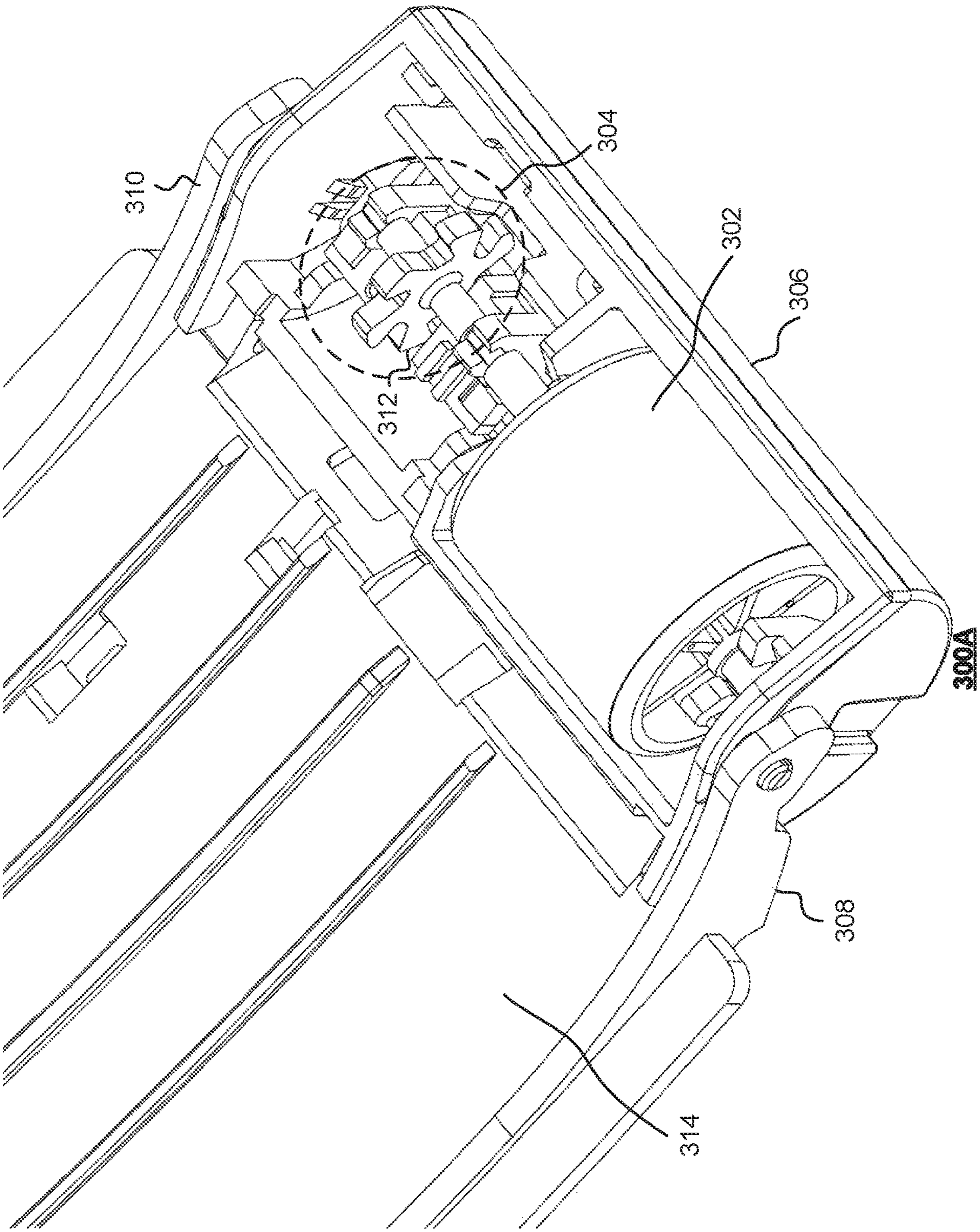
FIG. 3A depicts a view of a roller and associated encoder.

FIG. 3A shows a view 300A of a roller 302 and an encoder 304. The roller 302 is an example of the above described roller 136. The encoder 304 is an example of the above described encoder 134. The roller 302 is mounted in a housing 306. The housing 306 is carried by a pair of arms 308 and 310. The roller 136 is urged or otherwise biased against the substrate 106 on the substrate carrier, that is, in the direction of the axis of rotation of the substrate carrier 128 denoted by the centre-line of the substrate carrier 128 shown in FIG. 1.

The encoder 304 comprise a wheel 312. The wheel comprises a set of teeth. In the example shown, the set of teeth comprises six equally spaced, equal sized, teeth. Examples can be realised in which the teeth are at least one, or both of, not equally spaced or not equally sized. Examples can be realised in which at least one, or both of the spacing or size of the teeth vary circumferentially. Examples in which the teeth of the wheel 312 for which at least one, or both of the spacing or size of the teeth vary circumferentially can detect or determine a direction of rotation of the wheel. The set of teeth cooperate with an optical encoder, comprising an optical emitter and optical detector (not shown), of the encoder 304 to produce the signal 132 described above. It will be appreciated that the example depicted that comprises six teeth will produce a repeating period waveform. The period of the waveform will be determined by at least one, or both, of the spacing and size of the teeth.

Also shown in FIG. 3A is a platform 314 for shielding the substrate 106 on the substrate carrier 128 from damage.

Figure 3B:
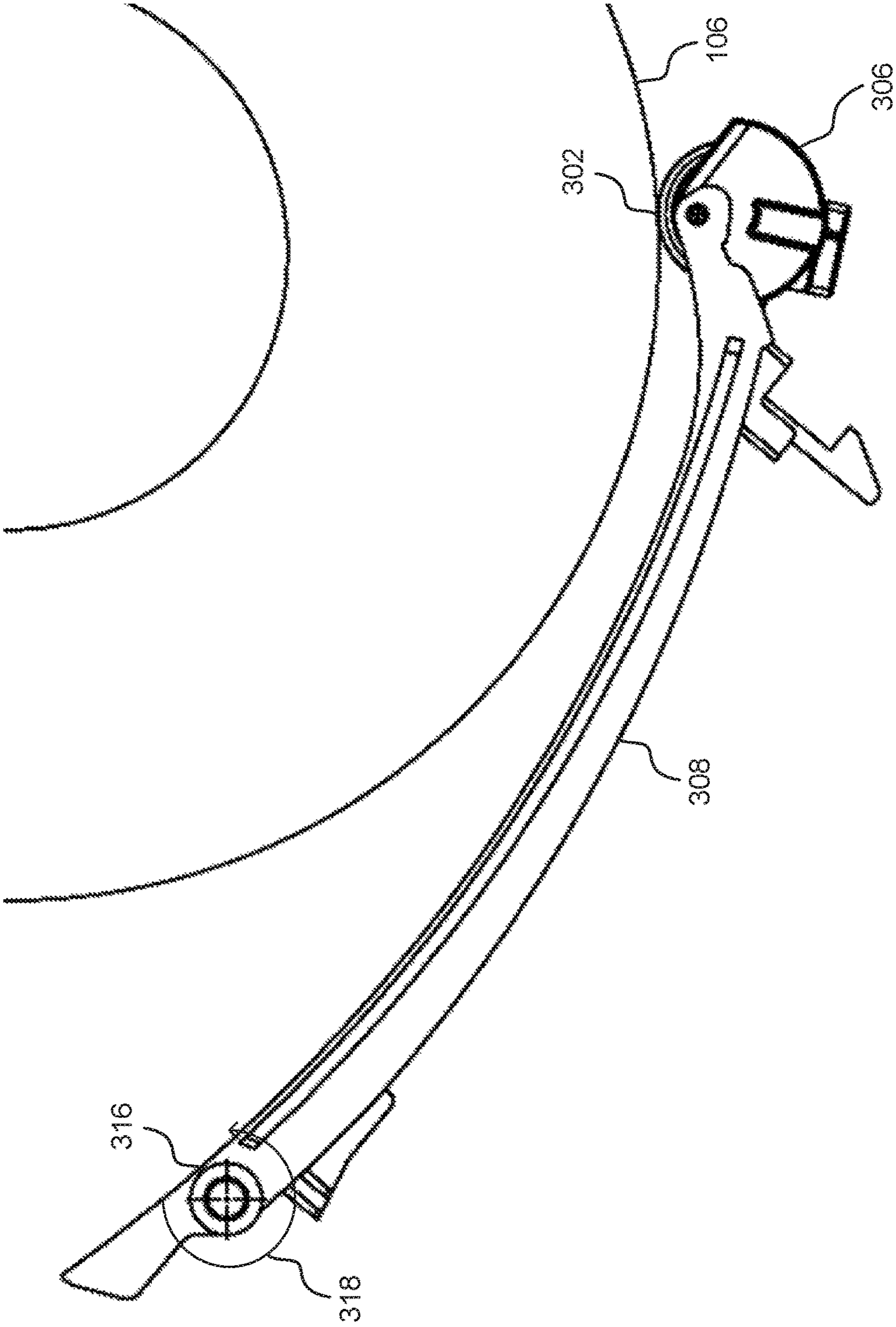
FIG. 3B shows a view of the roller and associated arm.

Referring to FIG. 3B, there is shown a view 300B of the relationship between roller 302, the substrate 106 and the arm 308. The arm 308 is biased to rotate about an axis of rotation 316 by the biasing arrangement (not shown) 202. The biasing arrangement 202 can comprise a spring such as, for example, a leaf spring or a coil spring. In the example shown, the biasing arrangement 202 is arranged to urge or bias the arm 308 in an anti-clockwise direction 318 about the axis 316.

The arm 310 can be configured the same as the arm 308. The arms 308 and 310 can be coupled and biased anti-clockwise about the axis 316 by the same biasing arrangement, coupled biasing arrangements or by independent biasing arrangements.

Figure 4A:
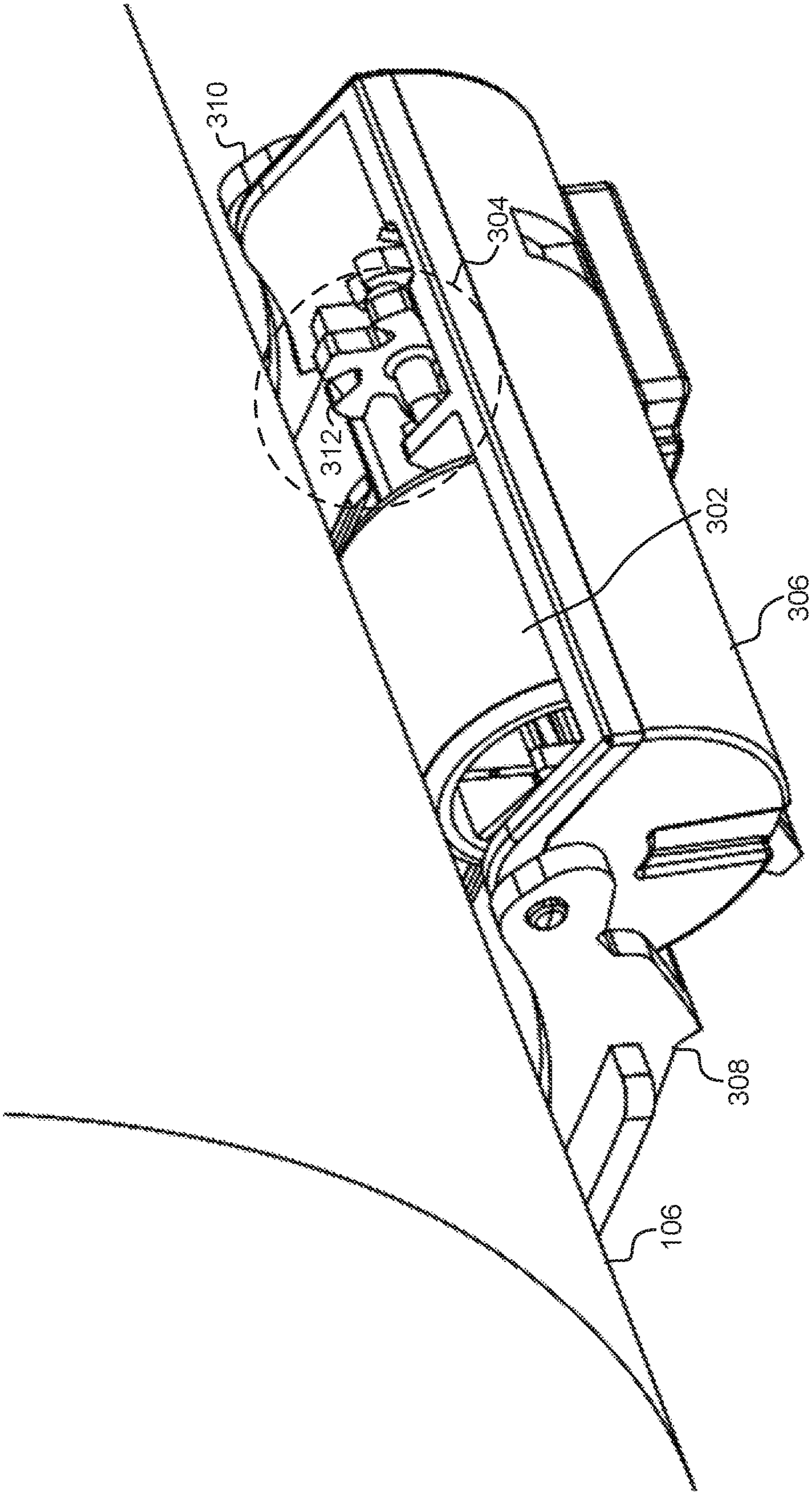
FIG. 4A illustrates a further view of the roller and encoder.

Referring to FIG. 4A, there is shown a view 400A of the roller 302 and encoder 304 described above with reference to FIGS. 3A and 3B in which the substrate 106 on the substrate carrier (not visible) is in contact with the roller 302.

Figure 4B:
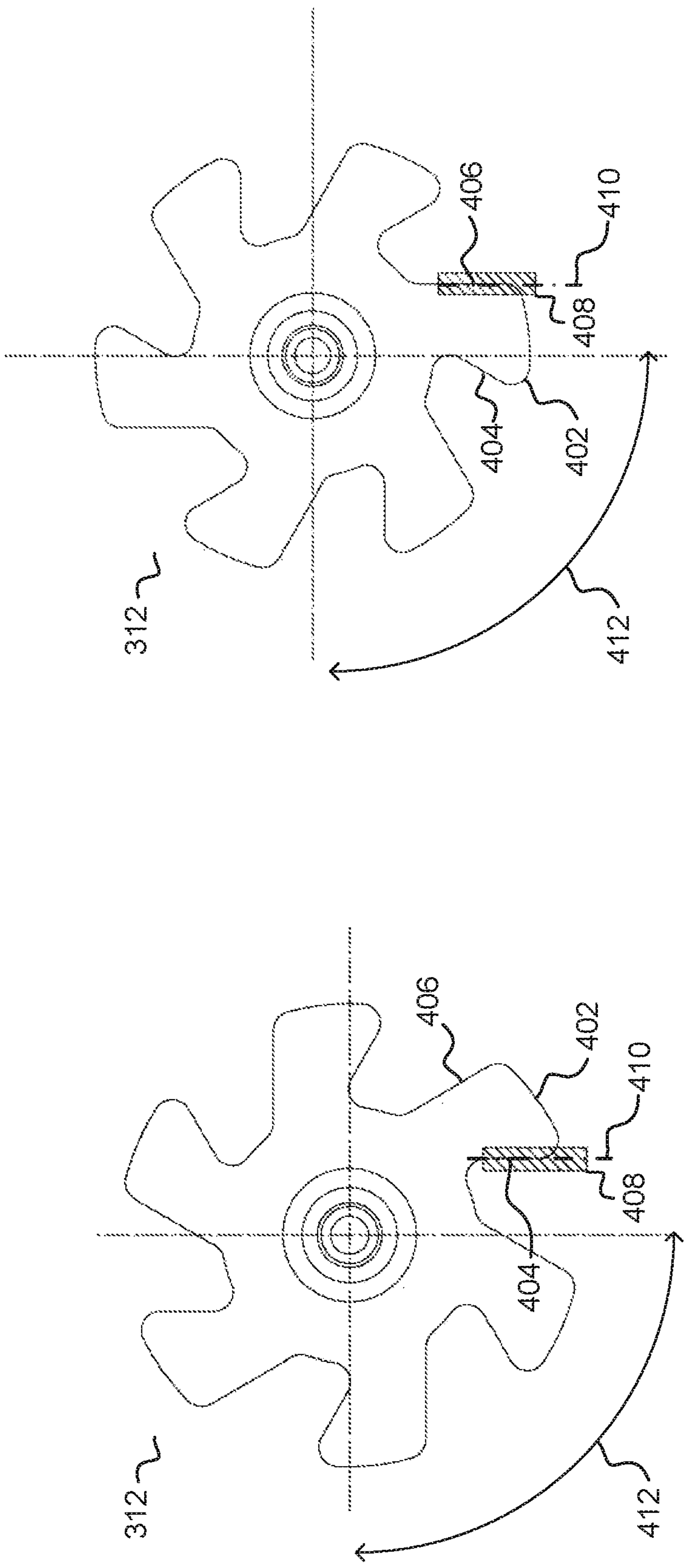
FIG. 4B depicts a view of an encoder wheel of the encoder.

Referring FIG. 4B, there is illustrated a view 400B of the encoder wheel 312 in two different positions. In both positions, a tooth 402 of the encoder wheel 312 has two edges 404 and 406. Also shown is a window 408 of the optical encoder (not shown). The edges 404 and 406 of the tooth are arranged such that a transit past or over the window 408 results in a relatively sharp or clean transition. The sharper or cleaner the transition, the shorter the rise and fall times of transitions of the output signal 132 produced by the encoder 304. Examples can be realised in which a centre line 410 of the optical window 408 and any transiting edges are aligned. In the left-hand view, the edge 404 and the centre line of the window 408 are aligned or in registry whereas in the right-hand view the edge 406 and the centre line of the window 408 are aligned or in registry. The edges 404 and 406 will generate rising or falling edges in the output signal 132 of the encoder depending on the direction of rotation 412 of the wheel 312. Examples can be realised in which each tooth of the wheel is configured as the above described tooth 402. The examples described herein can be realised in which the encoder output signal 132 comprises a square wave in which the pulses are indicative of the roller 136 rotating.

Figure 5:
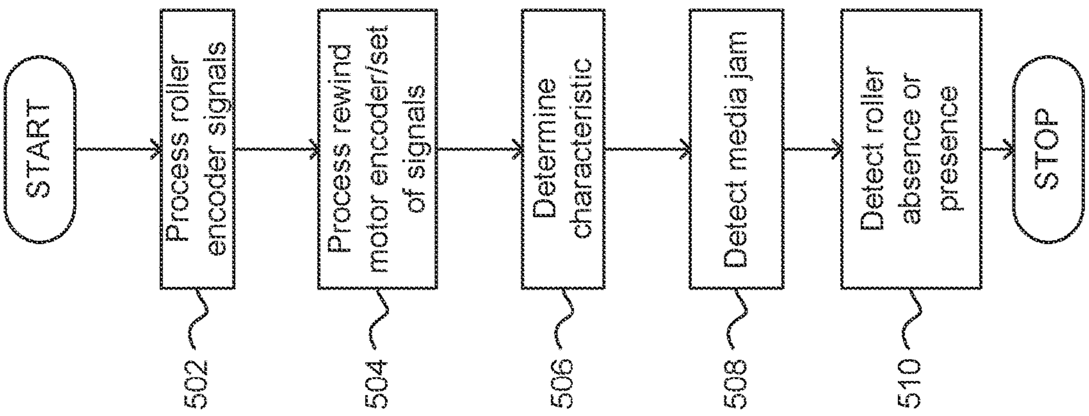
FIG. 5 shows a flowchart for processing the encoder output.

Referring to FIG. 5, there is shown a flowchart 500 of operations performed by the controller 118, or other processing entity. At 502, the controller 118 processes the signal 132 output by the encoder 134 to determine at least one of the angular speed, $\omega_2$, of the roller 136 or rotation of the roller 136. At 504, the controller 118 processes the set of signals 129 associated with the motor 131 that drives the substrate carrier 128 to determine at least one or more of FM, BM.

The controller 118 determines, at 506, the characteristic or measure associated with the substrate 106 on the substrate carrier 128 such as, for example, the radius, R1, of the substrate 106 on the substrate carrier 128.

The controller 118 detects, at 508, a substrate anomaly or error such as, for example, a substrate or media jam as described above.

The controller detects the presence or absence of the substrate carrier 128, at 510, as described above.

Examples can be realised in the form of machine instructions that can be processed by a machine. The machine can comprise a computer, processor, DSP, FPGA, circuitry or other logic, processor core, compiler, translator, interpreter or any other instruction processor. Processing the instructions can comprise interpreting, executing, converting, translating or otherwise giving effect to the instructions. The instructions can be stored on a machine readable medium, that is, machine readable storage. The machine readable storage can store the instructions in a non-volatile, non-transient, manner or in a volatile, transient, manner. The instructions can be arranged to give effect to any and all operations described herein taken jointly and severally in any and all permutations. The instructions can be arranged to give effect to any and all of the operations, devices, authenticators, flowcharts, protocols or methods described herein taken jointly and severally in any and all permutations. In particular, the machine instructions can give effect to, or otherwise implement, the operations of the flowchart depicted in, or described with reference to, FIG. 5, taken jointly and severally in any and all permutations.

Figure 6:
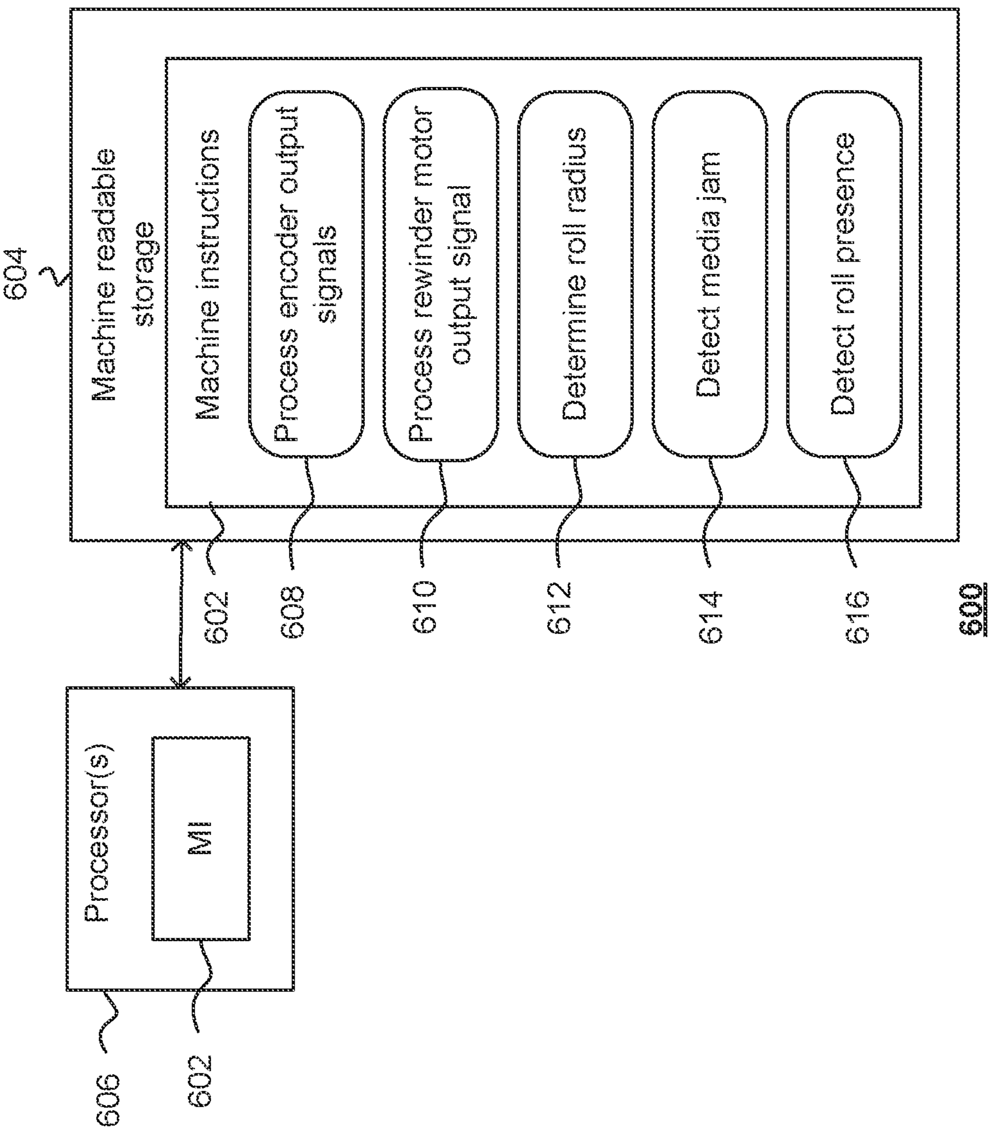
FIG. 6 illustrates machine readable storage storing machine readable instructions.

Therefore, FIG. 6 shows a view 600 of view 600 of machine instructions 602 stored using machine readable storage 604 for implementing the examples described herein. The machine instructions 602 can be processed by, for example, a processor 606 or other processing entity, such as, for example, an interpreter, as indicated above.

The machine instructions 602 comprise:

Instructions 608 to process the encoder signals 132 as described above,

Instructions 610 to process the set of signals 129 associated with the motor for driving the substrate carrier 128 as described above, Instructions 612 to determine the characteristic or measure associated with the substrate 106, such as, for example, the radius of the substrate 106 on the substrate carrier 128, Instructions 614 to detect a substrate anomaly or error such as, for example, a substrate or media jam as described above, and Instructions to detect the presence or absence of the substrate carrier 128 at 510 as described above; the foregoing instructions being taken jointly and severally in any and all permutations.

Although the above examples have been described with reference a printer 100 comprising a moveable carriage 108, examples can be realised in which a page wide array of print nozzles is used instead of a carriage that moves back and forth across the substrate.

Examples can be realised according to the following clauses:

Clause 1: A printer for printing onto a substrate, the printer comprising:

a roller having a respective radius (R2), the roller comprising a substrate engagement surface to rotate the roller in response to frictional coupling with a substrate; a roller encoder to generate a roller encoder signal associated with rotation of the roller; a mount to receive a carrier bearing the substrate; a drive (rewinder motor) arranged to rotate the carrier; a drive encoder to generate a drive encoder signal associated with rotation of the drive; a processor, responsive to the roller encoder signal and the drive encoder signal, to determine a characteristic associated with the substrate.

Clause 2: The printer of clause 1, in which the processor, responsive to the roller encoder signal and the drive encoder signal, to determine a characteristic associated with the substrate comprises logic or circuitry to determine a metric associated with the amount of substrate on the carrier.

Clause 3: The printer of clause 2, in which the logic or circuitry to determine a metric associated with the amount of substrate on the carrier comprises logic or circuitry to determine the radius (R1) of the substrate on the carrier.

Clause 4: The printer of clause 3, in which the logic or circuitry to determine the radius of the substrate on the carrier comprises logic or circuitry to determine the radius (R1) of the substrate on the carrier using a measure ($\omega_1$) of rotation of the drive, a measure ($\omega_2$) of rotation of the roller and the respective radius (R2).

Clause 5: The printer of clause 4, in which logic or circuitry to determine the radius (R1) of the substrate on the carrier using a measure ($\omega_1$) of rotation of the drive, a measure ($\omega_2$) of rotation of the roller and the respective radius (R2) comprises logic or circuitry to calculate the radius (R1) of the substrate from $$R1 = \frac{\omega_2 R2}{\omega_1}.$$

Clause 6: The printer of any preceding clause, in which the processor, responsive to the roller encoder signal and the drive encoder signal, to determine a characteristic associated with the substrate comprises logic or circuitry to determine a state or movement status associated with the substrate.

Clause 7: The printer of clause 6, in which the logic or circuitry to determine a state or movement status associated with the substrate comprises logic or circuitry to determine a substrate movement error/jam of the substrate along a substrate path of the substrate through the printer.

Clause 8: The printer of clause 7, in which the logic or circuitry to determine the substrate movement error/jam of the substrate along the substrate path of the substrate through the printer comprises logic or circuitry to generate a signal indicating the substrate movement error/jam of the substrate in response to the drive encoder signal being indicative of movement of the drive in conjunction with the roller encoder signal being indicative of no movement of the roller (Jam=FD AND $\overline{RR2}$).

Clause 9: The printer of clause 8, in which the logic or circuitry to generate a signal indicating the substrate movement error/jam of the substrate in response to the drive encoder signal being indicative of movement of the drive in conjunction with the roller encoder signal being indicative of no movement of the roller (Jam=FD AND $\overline{RR2}$) comprises logic or circuitry to generate the signal indicating the substrate movement error/jam of the substrate in response to the drive encoder signal being indicative of a forward or unspooling movement of the drive in conjunction with the roller encoder signal being indicative of no movement of the roller (Jam=FD AND $\overline{RR2}$).

Clause 10: The printer of any preceding clause, in which the processor, responsive to the roller encoder signal and the drive encoder signal, to determine a characteristic associated with the substrate comprises logic or circuitry to generate a carrier present, or absent, signal indicating whether or not the carrier has been detected.

Clause 11: The printer of clause 10, in which the logic or circuitry to determine the carrier present, or absent, signal indicating whether or not the carrier has been detected comprises logic or circuitry to generate the carrier present, or absent, signal in response to the drive encoder signal being indicative of movement of the drive in conjunction with the roller encoder signal being indicative of no movement of the roller (Absence=BM AND $\overline{RR2}$).

Clause 12: The printer of clause 11, in which the logic or circuitry to generate the carrier present, or absent, signal in response to the drive encoder signal being indicative of movement of the drive in conjunction with the roller encoder signal being indicative of no movement of the roller (Absence=BM AND $\overline{RR2}$) comprises logic or circuitry to generate the carrier present, or absent, signal indicating whether or not the carrier has been detected in response to the drive encoder signal being indicative of a backward movement of the drive in conjunction with the roller encoder signal being indicative of no movement of the roller (Absence=BM AND $\overline{RR2}$).

Clause 13: Machine readable instructions comprising instructions, arranged when processed, to process a roller encoder signal, associated with rotation of a substrate engaging roller, and a drive encoder signal, associated with a drive for rotating a carrier bearing the substrate, to determine a characteristic associated with the substrate.

Clause 14: Machine readable instructions of clause 13, in which the instructions to determine the characteristic associated with the substrate comprise instructions to determine at least one of (a) a measure associated with a volume of substrate on the carrier, (b) an error condition associated with the substrate, (c) absence of the substrate or (d) presence of the substrate taken jointly and severally in any and all permutations.

Clause 15: Machine readable instructions of clause 14, in which the instructions to determine the at least one of a measure associated with a volume of substrate on the carrier, an error condition associated with the substrate, absence of the substrate or presence of the substrate, comprise instructions to determine at least one of the radius of the substrate, to generate the signal indicating the substrate movement error/jam of the substrate in response to the drive encoder signal being indicative of a forward or unspooling movement of the drive in conjunction with the roller encoder signal being indicative of no movement of the roller (Jam=FD AND $\overline{RR2}$), or to generate the carrier present, or absent, signal indicating whether or not the carrier has been detected in response to the drive encoder signal being indicative of a backward movement of the drive in conjunction with the roller encoder signal being indicative of no movement of the roller (Absence=BM AND $\overline{RR2}$); the foregoing being taken jointly and severally in any and all permutations.

Clause 16: Machine readable storage storing machine readable instructions of any of clauses 13 to 15.

The invention claimed is:

1. A printer for printing onto a substrate, the printer comprising:

a roller having a respective radius, the roller comprising a substrate engagement surface to rotate the roller in response to frictional coupling with a substrate;

a roller encoder to generate a roller encoder signal associated with rotation of the roller;

a mount to receive a carrier bearing the substrate;

a drive arranged to rotate the carrier;

a drive encoder to generate a drive encoder signal associated with rotation of the drive; and a processor, responsive to the roller encoder signal and the drive encoder signal:

to determine a characteristic associated with the substrate;

wherein the processor to determine the characteristic associated with the substrate comprises logic or circuitry to:

determine a metric associated with the amount of substrate on the carrier, and determine the radius of the substrate on the carrier using a measure of rotation of the drive, a measure of rotation of the roller and the respective radius.

2. The printer of claim 1, in which logic or circuitry to determine the radius of the substrate on the carrier using a measure of rotation of the drive, a measure of rotation of the roller and the respective radius comprises logic or circuitry to calculate the radius from R1=(ω_2 R2)/ω_1, where R1 is the radius of the substrate on the carrier, w_1 is a measure of rotation of the drive, R2 is a respective radius of the roller, and w_2 is a measure of rotation of the roller and the respective radius R2.

3. The printer of claim 1, in which the processor, responsive to the roller encoder signal and the drive encoder signal, to determine a characteristic associated with the substrate comprises logic or circuitry to determine a state or movement status associated with the substrate.

4. The printer of claim 3, in which the logic or circuitry to determine a state or movement status associated with the substrate comprises logic or circuitry to determine a substrate movement error/jam of the substrate along a substrate path of the substrate through the printer.

5. The printer of claim 4, in which the logic or circuitry to determine the substrate movement error/jam of the substrate along the substrate path of the substrate through the printer comprises logic or circuitry to generate a signal indicating the substrate movement error/jam of the substrate in response to the drive encoder signal being indicative of movement of the drive in conjunction with the roller encoder signal being indicative of no movement of the roller.

6. The printer of claim 5, in which the logic or circuitry to generate a signal indicating the substrate movement error/jam of the substrate in response to the drive encoder signal being indicative of movement of the drive in conjunction with the roller encoder signal being indicative of no movement of the roller comprises logic or circuitry to generate the signal indicating the substrate movement error/jam of the substrate in response to the drive encoder signal being indicative of a forward or unspooling movement of the drive in conjunction with the roller encoder signal being indicative of no movement of the roller.

7. The printer of claim 1, in which the processor, responsive to the roller encoder signal and the drive encoder signal, to determine a characteristic associated with the substrate comprises logic or circuitry to generate a carrier present, or absent, signal indicating whether or not the carrier has been detected.

8. The printer of claim 7, in which the logic or circuitry to determine the carrier present, or absent, signal indicating whether or not the carrier has been detected comprises logic or circuitry to generate the carrier present, or absent, signal in response to the drive encoder signal being indicative of movement of the drive in conjunction with the roller encoder signal being indicative of no movement of the roller.

9. The printer of claim 8, in which the logic or circuitry to generate the carrier present in response to the drive encoder signal being indicative of movement of the drive in conjunction with the roller encoder signal being indicative of no movement of the roller comprises logic or circuitry to generate the carrier present signal indicating whether or not the carrier has been detected in response to the drive encoder signal being indicative of a backward movement of the drive in conjunction with the roller encoder signal being indicative of no movement of the roller.

10. A non-transitory readable storage storing machine readable instructions, arranged when implemented in a processor, to process a roller encoder signal, associated with rotation of a substrate engaging roller, and a drive encoder signal, associated with a drive for rotating a carrier bearing the substrate, to determine a characteristic associated with the substrate, wherein the instructions to determine the characteristic associated with the substrate comprise further instructions to determine at least one of:

a measure associated with a volume of substrate on the carrier, an error condition associated with the substrate, absence of the substrate, or presence of the substrate, and wherein the instructions further comprise at least one of instructions:

to generate the signal indicating the substrate movement error of the substrate in response to the drive encoder signal being indicative of a forward or unspooling movement of the drive in conjunction with the roller encoder signal being indicative of no movement of the roller, or to generate the carrier present signal indicating whether or not the carrier has been detected in response to the drive encoder signal being indicative of a backward movement of the drive in conjunction with the roller encoder signal being indicative of no movement of the roller.

* * * * *